United States Patent [19]
Park et al.

[11] Patent Number: 5,872,685
[45] Date of Patent: Feb. 16, 1999

[54] FLYING-TYPE NEGATIVE PRESSURE AIR BEARING SLIDER

[75] Inventors: Ki-Ook Park; In-Eung Kim; In-Seop Jeong, all of Seoul; Tae-Seok Park, Suwon, all of Rep. of Korea

[73] Assignee: Samsung Electronics Co., Ltd., Suwon, Rep. of Korea

[21] Appl. No.: 916,338

[22] Filed: Aug. 22, 1997

[51] Int. Cl.$^6$ ....................................................... G11B 5/60
[52] U.S. Cl. ............................................................ 360/103
[58] Field of Search ............................................. 360/103

[56] References Cited

U.S. PATENT DOCUMENTS

| | | |
|---|---|---|
| 5,200,868 | 4/1993 | Chapin et al. . |
| 5,353,180 | 10/1994 | Murray . |
| 5,490,025 | 2/1996 | Dorius et al. . |
| 5,568,981 | 10/1996 | Nepela et al. . |
| 5,654,853 | 8/1997 | Hagen ..................................... 360/103 |
| 5,726,830 | 3/1998 | Koishi ..................................... 360/103 |

*Primary Examiner*—A. J. Heinz
*Attorney, Agent, or Firm*—Jones & Volentine, L.L.P.

[57] ABSTRACT

A negative pressure air bearing slider includes a slider body for flying above a surface of a recording disc during relative rotation of the recording disc. First and second projections extend from a lead portion of a principal surface of the slider body to define first and second air bearing surfaces, respectively, the first and second air bearing surfaces being spaced apart from each other in the lateral direction of said slider body. A third U-shaped projection extends from the principal surface and includes a curved front wall portion at least partially located between the first and second projections and first and second side wall portions extending from opposite ends of the curved front wall portion to a rear portion of the principal surface so as to define a rounded negative pressure cavity therein.

20 Claims, 13 Drawing Sheets

FLYING-TYPE NEGATIVE PRESSURE AIR BEARING SLIDER

BACKGROUND OF THE INVENTION

1. Field of the Invention

The present invention relates to a magnetic disk drive device, and in particular, to a flying-type negative pressure air bearing slider for a transducer head assembly of a magnetic disk drive device.

2. Description of the Related Art

Transducer head assemblies have been designed to literally fly over a rapidly rotating disc, and include an air bearing slider for carrying a magnetic transducer proximate a rapidly rotating disc. The transducer, in the case of flying-type sliders, is a thin-film head or a magneto-resistive head.

In magnetic disk technologies, it is generally desired to achieve higher data recording densities without a substantial change in form factor. In the context of the air bearing slider, increased recording densities are obtainable by maintaining the flying height, pitch angle and roll angle constant over the whole disk surface, to thereby enhance floating stability and contact start stop (CSS) reliability.

On the one hand, the magnetic head must fly at a sufficient height to avoid frictionally related problems caused by physical contact during data communication between the magnetic head and the rapidly rotating disk. On the other hand, the head should be made to fly as low as possible to obtain the highest possible recording densities. As the magnetic head is fixed to the slider mechanism, the disk recording density increases as the flying height of the slider decreases. Accordingly, it is preferred that the slider fly as close as possible to the disk surface without actually contacting the disc surface. A constant flying height is preferably maintained, regardless of variations in tangential velocity during flying, cross movements of the slider during data search operations, and changes in skew angle in the case of rotary type actuators.

To achieve stable flying characteristics, the slider should also fly at a pitch angle that falls within a safe range of a predetermined value. The pitch angle is defined as the tilt angle between the principal plane of the slider in the tangential direction of the rotating disc and the principal plane of the disc surface. The pitch angle is positive in the normal case in which the flying height of the rear portion of the slider is lower than that of the front portion of the slider. A transducer is generally situated at the lowest position of the rear portion of the slider for maximizing recording data capacity. If the designed pitch angle is too small, the possibility exists that a disturbance will cause the front end of the slider dip down such that a negative pitch ensues resulting in a collision with the rapidly rotating disk. On the other hand, if the designed pitch angle is too large, the air stiffness needed for stable flying can be disadvantagously reduced. Therefore, to maintain stability while avoiding the situation of a negative pitch angle, the slider should be configured such that the pitch angle can be controlled to fall within an optimum value range. Another factor to consider regarding pitch angle is the general tendency for the pitch angle to increase with skew angle increases as the slider is positioned in a radially outward direction over the disc surface. Thus, the pitch angle should fall within the safe range regardless of skew angle variations.

Differing hydrodynamic forces support the inner and outer air bearing surface (ABS) rails of the slider, and resulting variations in side leakage air flow with skew angle changes can generate roll angle variations. Here, the inner and outer rails refer to those ABS rails of the slider positioned toward the inner periphery and outer periphery of the disc, respectively. Also, roll angle is defined as the tilt angle between the principal plane of the slider in the radial direction of the disc and the principal plane of the disc surface. The roll angle is positive in the normal case where the transducer is positioned closest to the rail which travels closest to the disc surface. During data read/write processing, the read/write transducer should be located at the lowest point of slider body relative to the radial direction of the disc surface, i.e., the roll angle should be positive, to thus maximize recording density. A positive and constant roll angle over the entire disk surface area is a key factor in maintaining a stable flying condition.

FIG. 1 is a schematic perspective view of a conventional tapered flat slider. In FIG. 1, two rails 11 a are formed in parallel at a predetermined height on a surface of a slim hexahedron body 10a to thus form lengthwise extending ABS's. A tapered or sloped portion 12a is formed at each leading edge portion of the ABS rails 11a. In such a structure, air within a very thin boundary layer rotates together with the rotation of the disk due to surface friction. When passing between the rotating disk and the slider, the air is compressed by the ramp 12a on the leading edge of the ABS 11a. This pressure creates a hydrodynamic lifting force at the ramp section which is sustained through the trailing edge of the ABS, thus allowing the slider to fly without contacting the disk surface.

The conventional slider of this type suffers a drawback in that the flying height, pitch angle and roll angle vary considerably according to the skew angle of the rotary type actuator, i.e., according to the radial position of the slider over the disc surface. For flying heights of 3.0 millionths of an inch and greater, minor height and tilt fluctuations in the slider do not generally affect the read/write operations of the disk. However, current-day standards require flying heights below 2.0 millionths of an inch. At such small flying heights, even minor variations in pole tip flying height can severely affect the reliability of the head read/write function of a hard disk drive.

An improved configuration aimed at countering flying height variations over the entire disc surface is the transverse pressure contour (TPC) slider, as described, for example, in U.S. Pat. No. 4,673,996. As shown in FIG. 2 herein, this slider is also characterized by ABS rails 11b formed on a slider body 10b, and ramp portions 12b formed at the leading edge of the ABS rails 11b. In addition, however, a step-down 111b is formed lengthwise on the both sides of each of the ABS rails 11b. The slider of this TPC structure has the advantage of maintaining reasonably constant flying height regardless of skew angle variations. However, this TPC slider exhibits reduce flying stability which is caused by insufficient air stiffness resulting in the reduction of the ABS surface area. Also, the TPC modification does not improve pitch and roll angle variations resulting from changes in skew angle.

In light of the above, to better realize a constant flying height and constant pitch and roll angles and to obtain an improve contact start stop (CSS) performance, most current air bearing sliders have adopted a negative pressure air bearing (NPAB) type of configuration with a variety of air bearing surface shape changes. A basic NPAB slider has the same structure of the slider shown in FIG. 1, together with a cross rail connecting the ABS rails. That is, as shown in FIG. 3, two ABS rails 11c each having a slope 12c at a leading edge thereof are formed in parallel on a surface of a body 10c. A cross rail 13c having the same height as the ABS rail 11c is formed between the rails 11c proximate the slopes 12c. The cross rail 13c creates a negative pressure cavity 14c in proximity to the central surface portion of the body 10c. Thus, since the pressure of the air passing over the cross rail is diffused as it passes the negative pressure cavity 14c, a pulling or suction force is downwardly applied on the slider which reduces suspension gram load and provides the advantage of a fast take off from the disc surface. The counter action between the positive and negative forces reduces the sensitivity of the slider flying height relative to disc velocity and increases the slider stiffness characteristics.

Because of sub-ambient pressure of cavity 14c, roll angle during a high skew condition can worsen, meaning that the NPAB slider of FIG. 3 exhibits more negative roll effects at high skew positions than the convention tapered flat slider of FIG. 1. Also, there is a tendency for debris to gather at the cross-rail 13c. Such debris can ultimately have an adverse effect on performance.

SUMMARY OF THE INVENTION

In consideration of the above, it is an object of the present invention to provide a negative pressure air bearing slider for a hard disk drive in which the application of negative pressure is stable, and the accumulation of debris is minimized.

It is another object of the present invention to provide a negative pressure air bearing slider for a hard disk drive which can maintain a relatively constant flying height regardless of skew angle.

It is still another object of the present invention to provide a negative pressure air bearing slider for a hard disk drive in which roll angle variations are minimized, sufficient air stiffness is maintained, and a constant optimum pitch angle is held.

Accordingly, to achieve the above and other objects, there is provided according to the invention a negative pressure air bearing slider, comprising: a slider body for flying above a surface of a recording disc during relative rotation of the recording disc, the slider body having a principal surface for confronting the disc surface, said principal surface having a lead portion, a rear portion, a first side portion and a second side portion, wherein the lead portion is spaced upstream of the rear portion relative to a longitudinal direction of said slider body which is coincident with a tangential rotational direction of the recording disc, and wherein the first side portion is spaced from the second side portion relative to a lateral direction of said slider body; first and second projections extending from said lead portion of said principal surface of said main body to define first and second air bearing surfaces, respectively, wherein said first and second air bearing surfaces are spaced apart from each other in the lateral direction of said slider body; and a third U-shaped projection extending from said principal surface and having a curved front wall portion at least partially located between said first and second projections and first and second side wall portions extending from opposite ends of said curved front wall portion to said rear portion of said principal surface so as to define a rounded negative pressure cavity therein, said curved front wall portion and said first and second curved side wall portions being spaced apart from said first and second projections, wherein the first and second curved side wall portions respectively extend along said first and second side portions of said principal surface and define third and fourth air bearing surfaces located at said rear portion of said principal surface and space apart from each other relative to the radial direction of said slider body.

BRIEF DESCRIPTION OF THE DRAWINGS

The above objects and advantages of the present invention will become more apparent from the detailed description of the preferred embodiments thereof with reference to the attached drawings, in which.

DETAILED DESCRIPTION OF THE PREFERRED EMBODIMENTS

Figure 1:
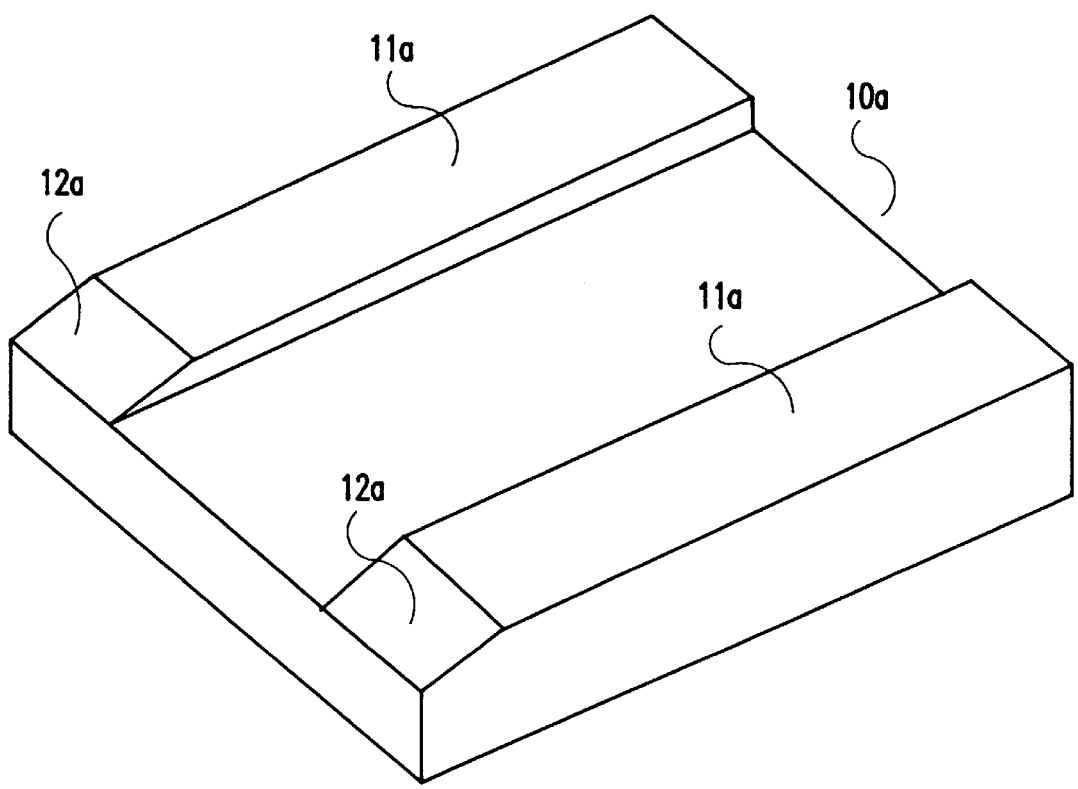
FIG. 1 is a perspective view illustrating a conventional slider having tapered and flat air bearing surfaces.
Figure 2:
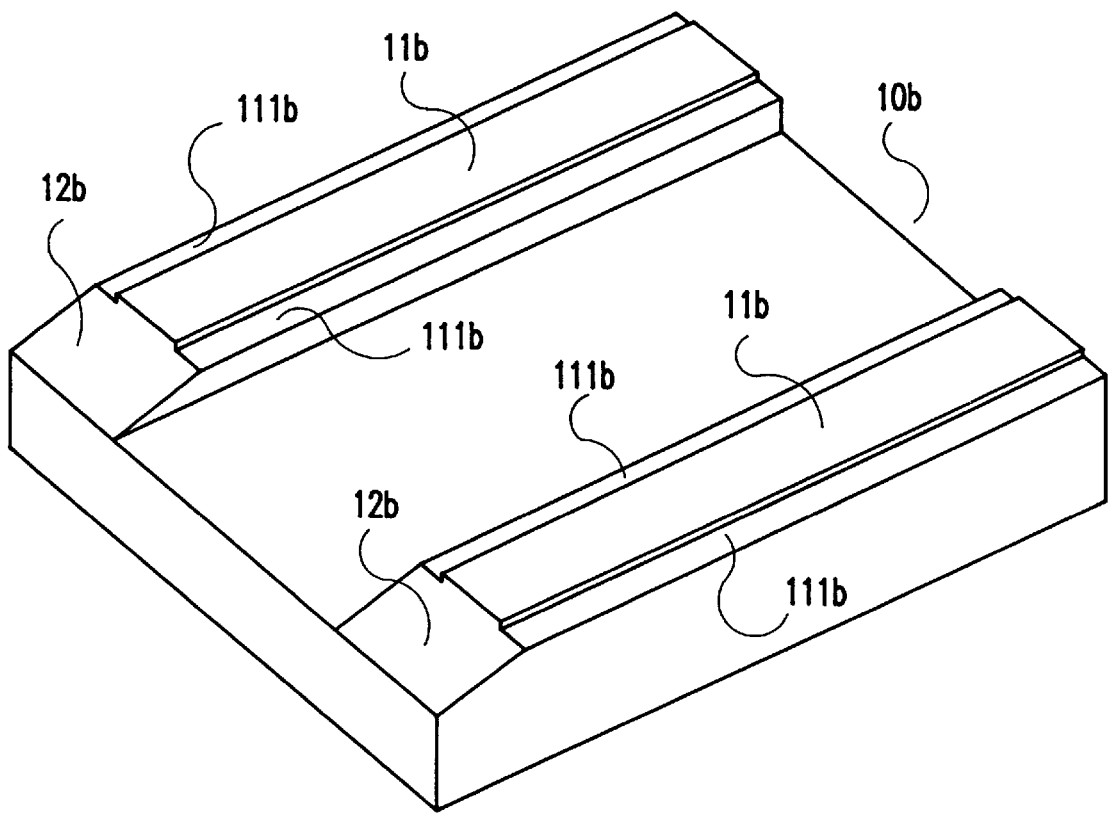
FIG. 2 is a perspective view illustrating a conventional slider having a transverse pressure contour (TPC) configuration.
Figure 3:
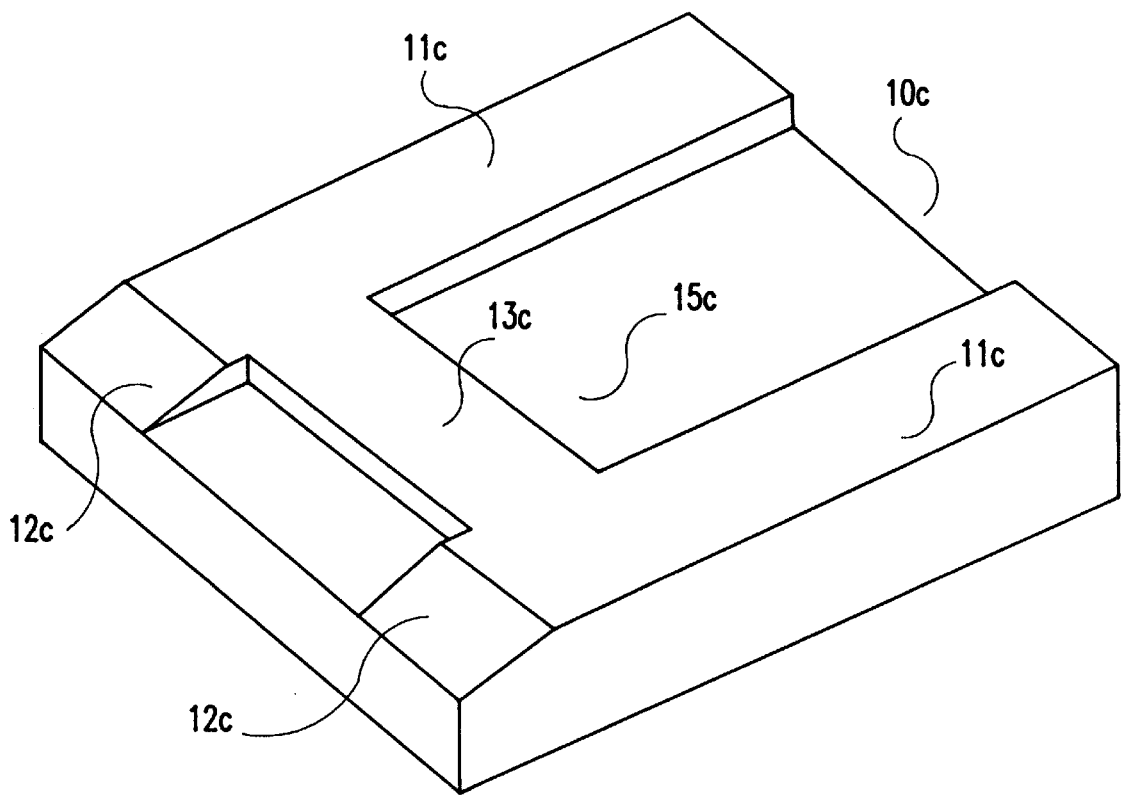
FIG. 3 is a perspective view illustrating a conventional slider having a negative pressure air bearing (NPAB) configuration.
Figure 4:
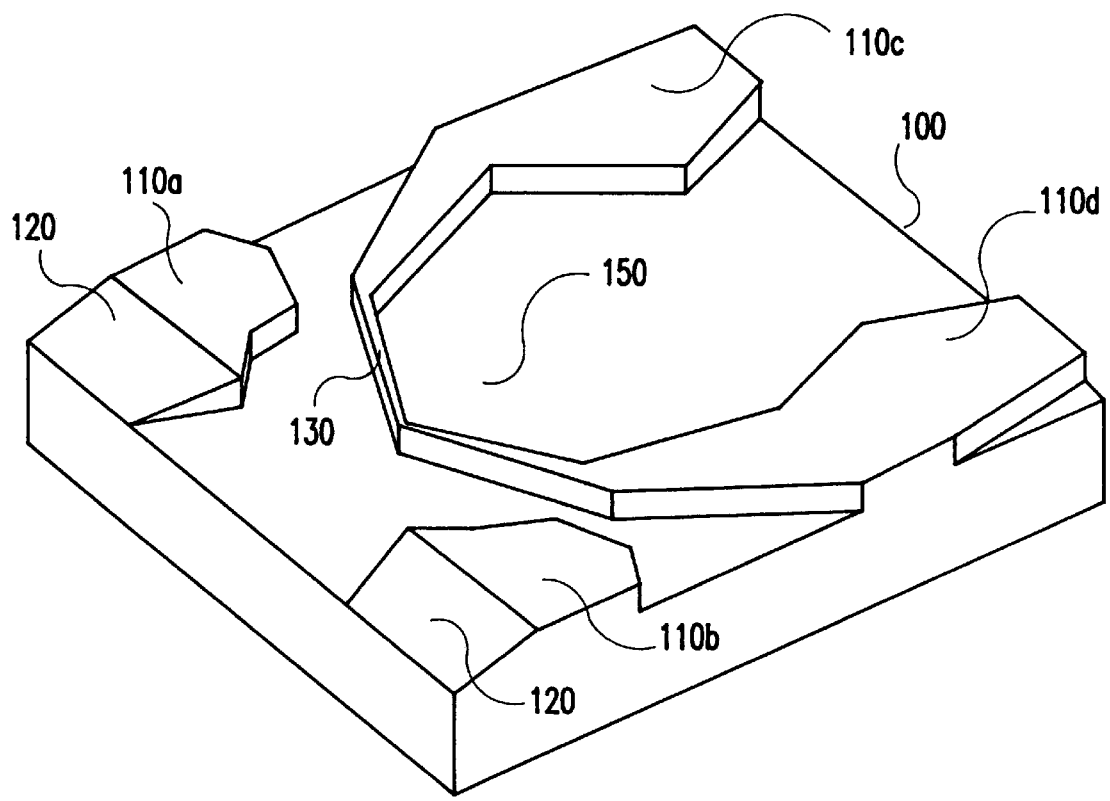
FIG. 4 is a perspective view illustrating an embodiment of a negative pressure slider for a hard disk drive according to the present invention.
Figure 5:
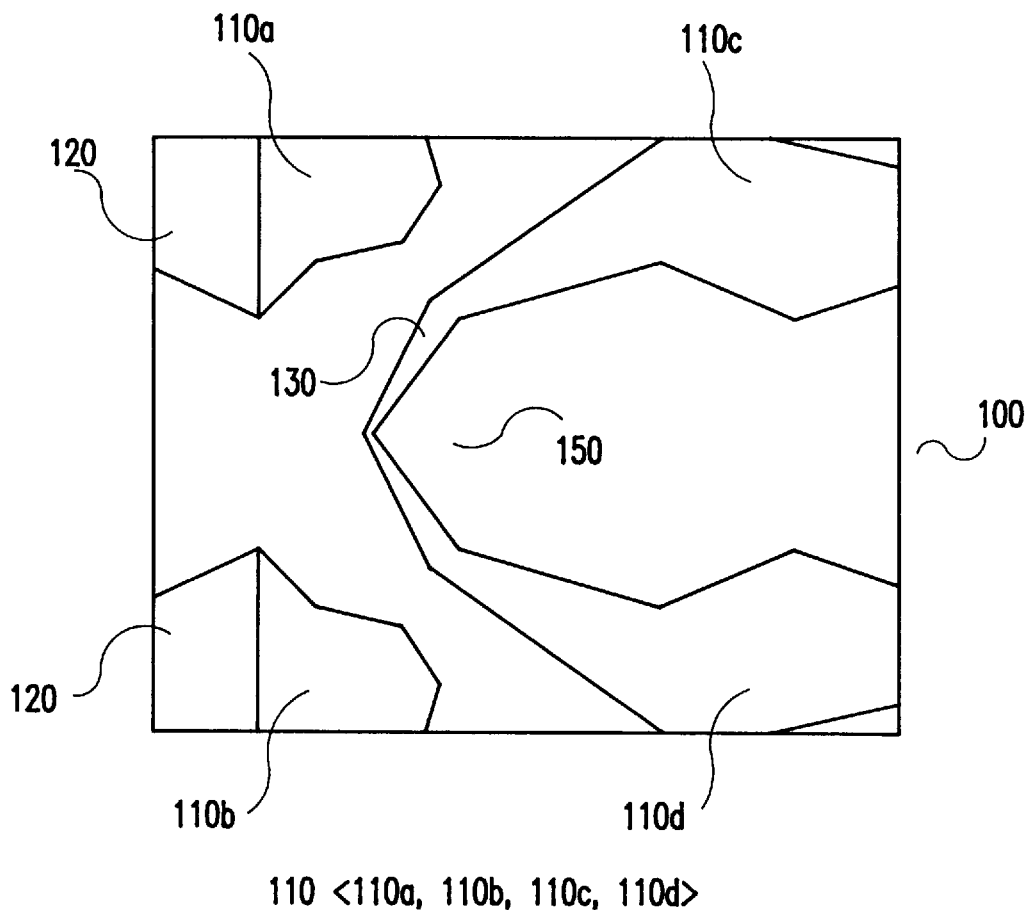
FIG. 5 is a plan view illustrating an embodiment of a negative pressure slider for a hard disk drive according to the present invention.

FIGS. 4 and 5 respectively illustrate a perspective view and a plan view of one embodiment of a negative pressure slider for a hard disk driver according to the present invention.

As shown in FIGS. 4 and 5, first and second ABS rails 110a and 110b are provided at a lead surface portion of a slider body 100. The lead ABS rails 110a and 110b are symmetrically or unsymmetrically disposed on opposite sides of a longitudinal axis of the slider body 100 and are aligned with one another in a lateral direction of the slider body 100, and provide a positive lifting force at an air inlet between the slider body 100 and the disc surface (not shown). Also, a ramp portion 120 extends from a lead edge of the slider body 100 to the ABS rails 110*a* and 110*b*.

ABS rails 110*c* and 110*d* are provided at the rear surface portion of the slider body 100. These trailing ABS rails 110*c* and 110*d* are symmetrically disposed on opposite sides of a central longitudinal axis of the slider body 100 and are aligned with one another in lateral direction of the slider body 100, and provide a positive lifting force at an air outlet between the slider body 100 and the disc surface (not shown). In operation, the front and rear ABS rails 110*a*, 110*b*, 110*c* and 110*d* generate sufficient positive pressure to support the slider body 100 in a suspended state.

In addition, as shown in FIGS. 4 and 5, a curved cross rail 130 extends between the rear ABS rails 110*c* and 110*d*. The curved cross rail 130 and the ABS rails 110*c* and 110*d* together define a U-shaped projection extending from the principal surface of the slider 100. The curvature of the cross rail 130 forms a rounded negative pressure cavity 150 at the center of the slider body 100. It is noted that the curved cross rail 130 should be made as thin as possible to avoid adverse influence on the positive pressure areas at the four corners while at the same time providing a stable and centrally located negative pressure area.

The negative pressure cavity 150 functions to provide a downward pulling action on the slider body 100, which in turn creates a gram load equivalent effect that enhances stability. The rounded configuration reduces the skew angle dependency on the magnitude of gram load equivalency. In other words, since the negative pressure cavity is rounded, angular variations in the direction of air flow resulting from skew angle changes do not substantially alter the action of the negative pressure cavity 150. This results in reduced flying characteristic (flying height and roll angle) variations as the slider is position at different diameters along the disc surface. Skew angle related variations are further minimized by the four stable positive lifting forces positioned at each corner around the centrally located negative pressure cavity.

Another advantage of the curved configuration of the cross rail 130 resides in the fact that contaminates will have less of a tendency to accumulate against the front wall of the cross rail. That is, contaminates will instead tend to travel along the curved front wall and exit off the side of the slider body between the gaps formed by the front corner ABS projections. This also enhances performance over the long run.

Figure 6:
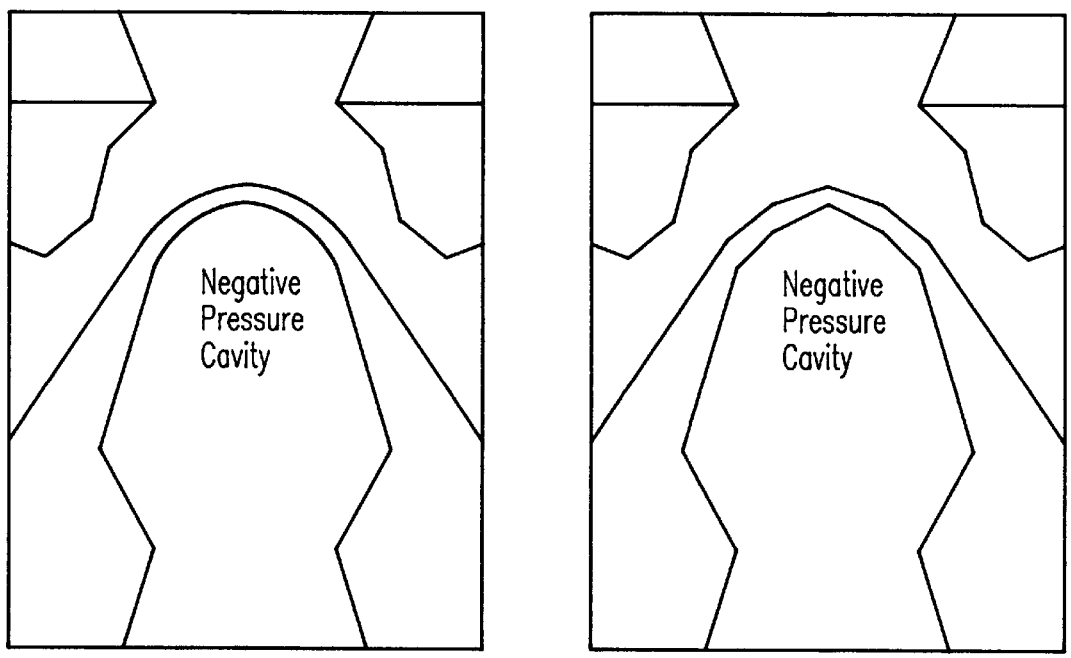
FIGS. 6(a) and 6(b) are plan views illustrating alternative cross rail configurations of the negative pressure slider for a hard disk drive according to the present invention.

As shown in FIG. 6, the curved-shape cross rail 130 may be smoothly configured without inner or outer corners, or it instead may be formed by a series of connected straight sidewall segments, or a combination thereof. In any case, a rounded negative pressure region is formed in proximity to the geometrical center of the slider body.

Figure 7:
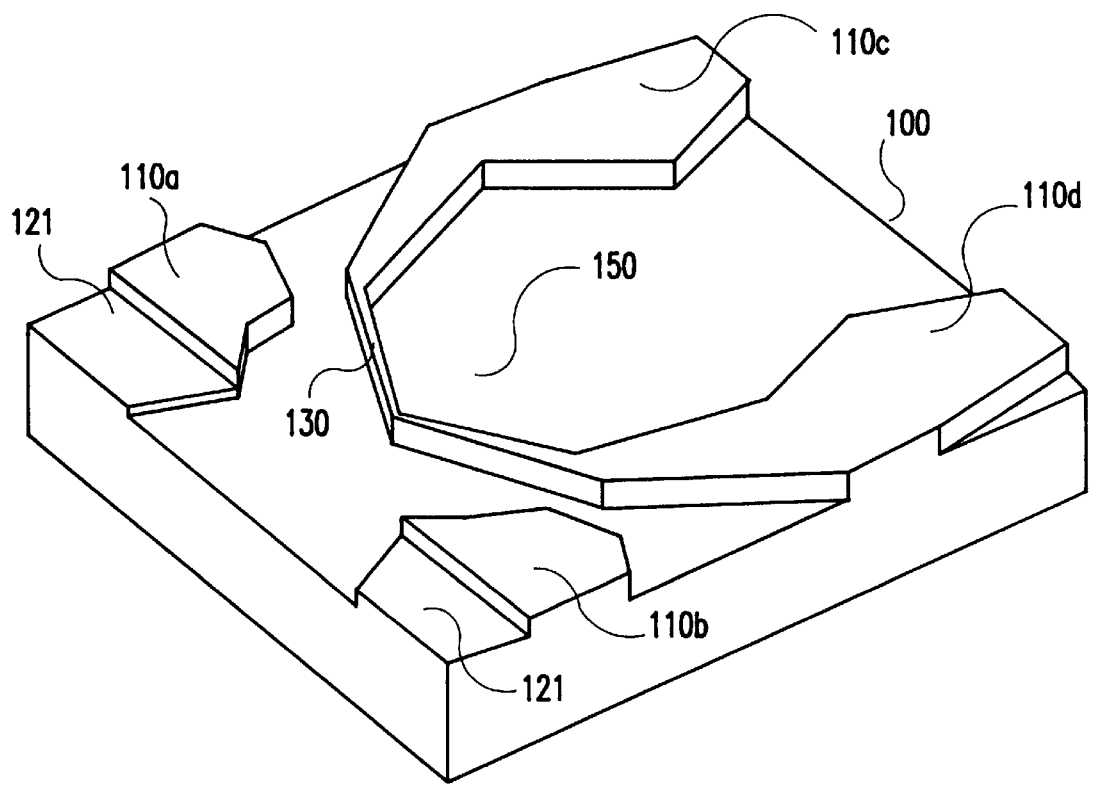
FIG. 7 is a perspective view illustrating the slider of another embodiment of the invention.

Referring again to FIG. 4, the air that supports lead ABS's 110*a* and 110*b* is initially compressed through action of the respective ramp regions 120 positioned at the front edge of the slider body 100. The amount of air can be adjusted by changing the inclination angle of the ramp 120. Lithography techniques are used to create complex NPAB-type sliders, and a typical inclination of the etched surface obtained through lithography is around 18 degrees. Also, as shown in FIG. 7, the slider ramp regions 120 can be completely replaced by shallow recessed edge steps 121 through a lithography process.

Figure 8:
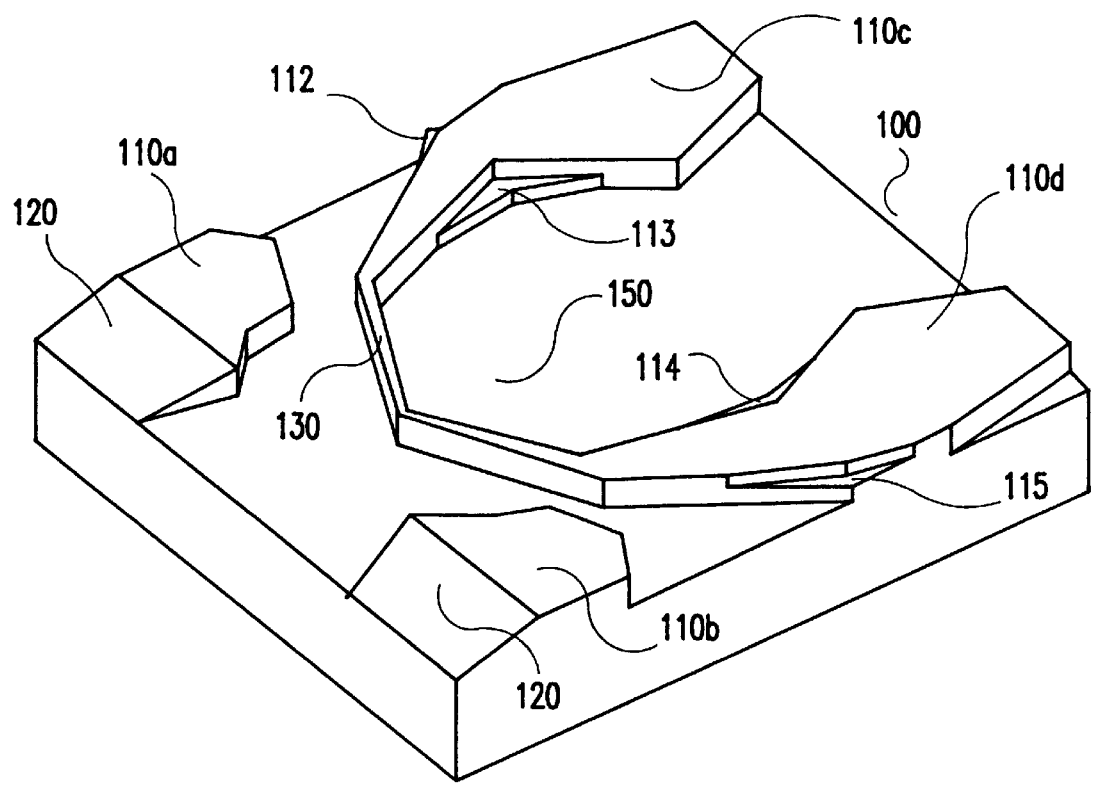
FIG. 8 is a perspective view illustrating the slider of yet another embodiment of the invention.

FIG. 8 illustrates an approach for minimizing side air flow leakage and increasing the amount of air supporting the rear ABS rails. In this embodiment, an interface region between the ABS rail 110*c* and the cross rail 130 includes a stepped down surface portion 112 extending between the ABS rail 110*c* and an edge of the slider body 100, and a stepped down surface portion 113 extending between the ABS rail 110*c* and said negative pressure cavity 150. Similarly, an interface region between the ABS rail 110*d* and the cross rail 130 includes a stepped down surface portion 115 extending between the ABS rail 110*c* and another edge of the slider body 100, and a stepped down surface portion 114 extending between the ABS rail 110*d* and said negative pressure cavity 150. Particularly under the condition of a skew angle variation, additional pressure is accumulated at the step portions 112, 113, 114 and 115, and as a result, more compressed air is applied to the rear ABS rails and the effects of skew angle variations can be reduced. It may also be useful to prepare unsymmetrical shallow edge steps so as to maximize the effects of the edge step functions.

Figure 9A:
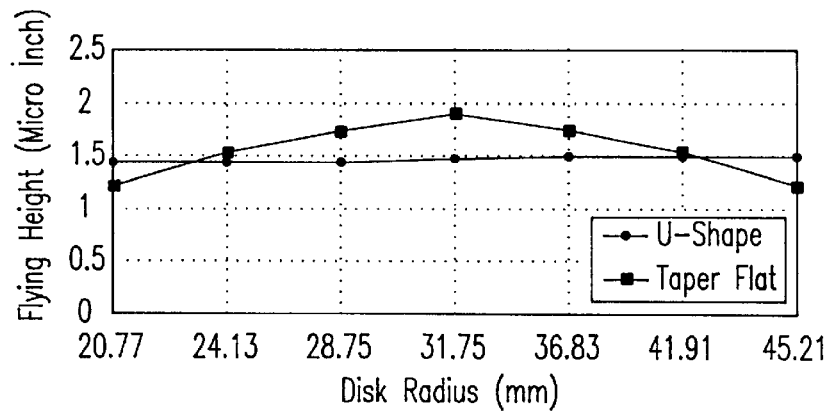
FIG. 9(a) shows comparative flying heights versus disc radius of the U-shaped NPAB slider and the conventional tapered flat slider.
Figure 9B:
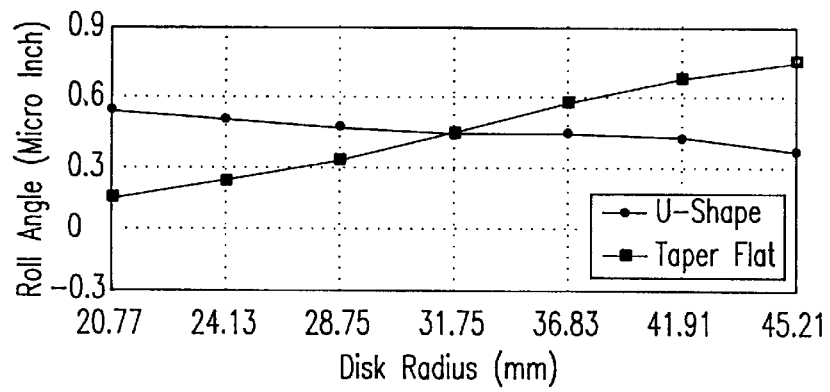
FIG. 9(b) shows comparative roll angles versus disc radius of the U-shaped NPAB slider and the conventional tapered flat slider.
Figure 9C:
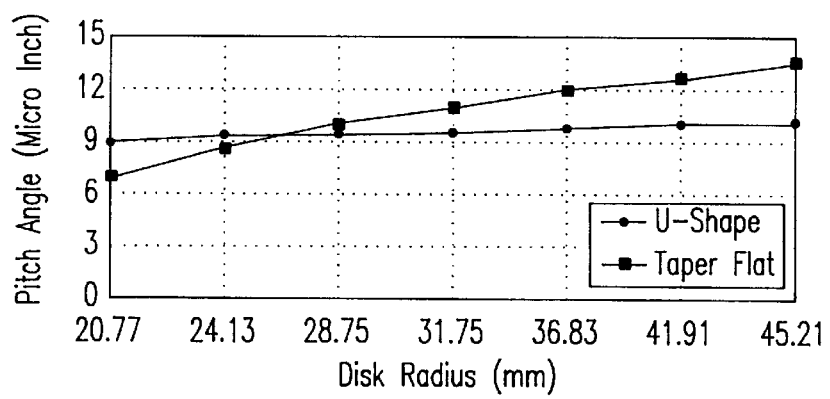
FIG. 9(c) shows comparative pitch angles versus disc radius of the U-shaped NPAB slider and the conventional tapered flat slider.

A typical performance result of this invention is shown in FIGS. 9(*a*) through 9(*c*). In particular, FIG. 9(*a*) shows comparative flying heights versus disc radius of the U-shaped NPAB slider and the conventional tapered flat slider; FIG. 9(*b*) shows comparative roll angles versus disc radius of the U-shaped NPAB slider and the conventional tapered flat slider; and FIG. 9(*c*) shows comparative pitch angles versus disc radius of the U-shaped NPAB slider and the conventional tapered flat slider. It is clear that these performance characteristics of the invention are superior to those of the tapered flat slider.

Further modifications of the invention will now be described with reference to FIGS. 10–13.

Figure 10:
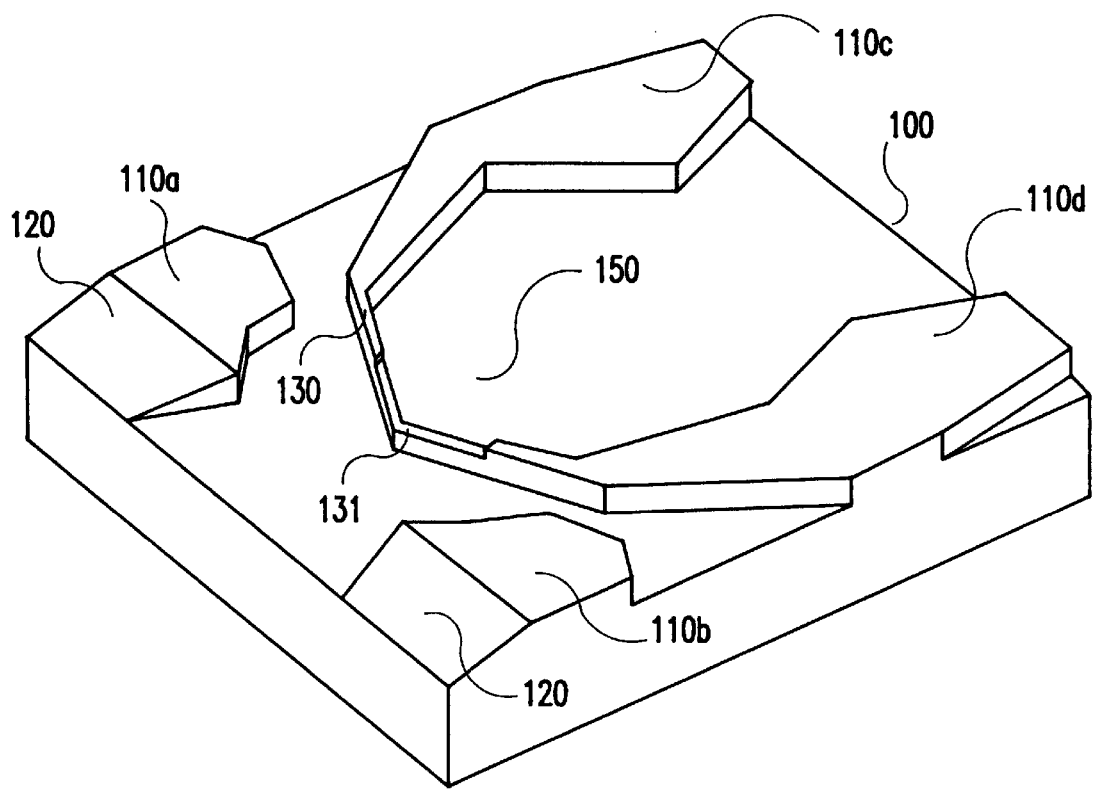
FIGS. 10–11 are perspective views of a modified embodiment of the invention for relieving negative pressure during an initial operation so as avoid retardation in take-off time; and, FIGS. 12–13 are perspective views of a modified embodiment of the invention for relieving negative pressure during an initial operation so as avoid retardation in take-off time, and for improving a roll angle effect by increasing air pressure on one of two major air bearing surfaces.

Characteristics of the negative pressure cavity 150 may in some instances retard the take-off of the slider during an initial operational phase. This problem is largely overcome by the provision of a shallow recessed step 131 on the curved cross rail 130 as shown in FIG. 10. The recessed step 131 allows sufficient air flow to prevent delay in the slider take-off period. This recessed step can also reduce debris accumulation on the cross rail.

Figure 11:
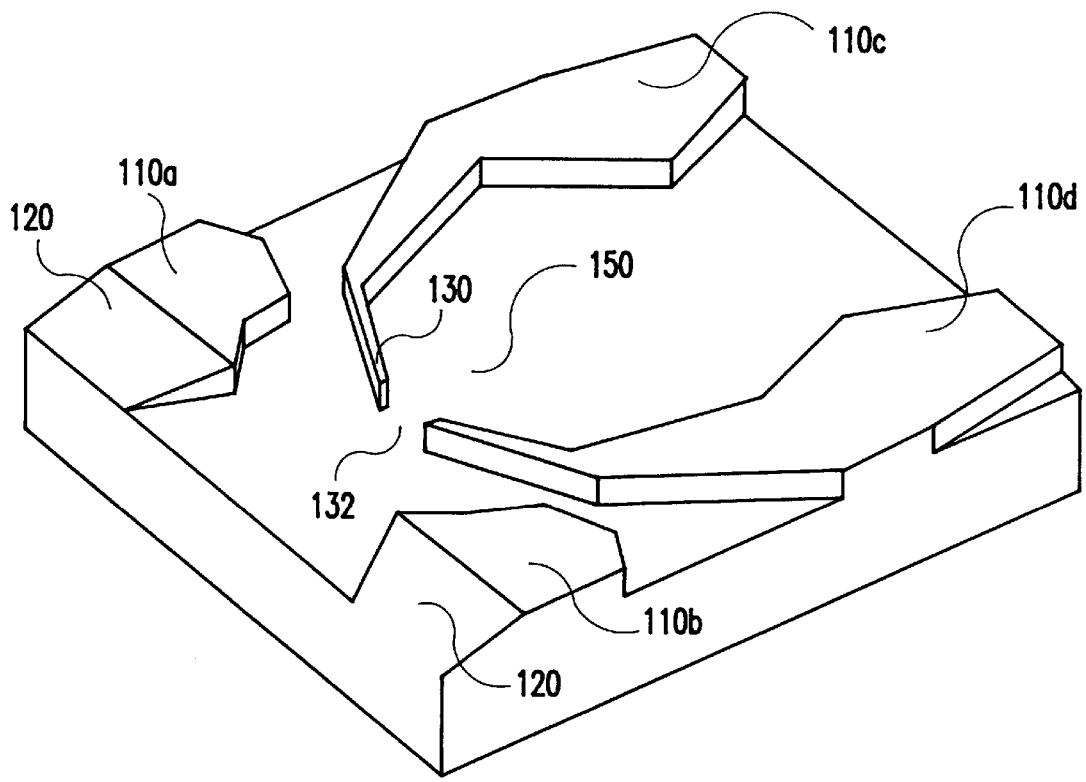

As an alternative to the recess 131, a gap 132 in the cross rail 130 may instead be provided as shown in FIG. 11. This configuration provides similar results of relieving the negative pressure during take-off and reducing debris accumulation.

Figure 12:
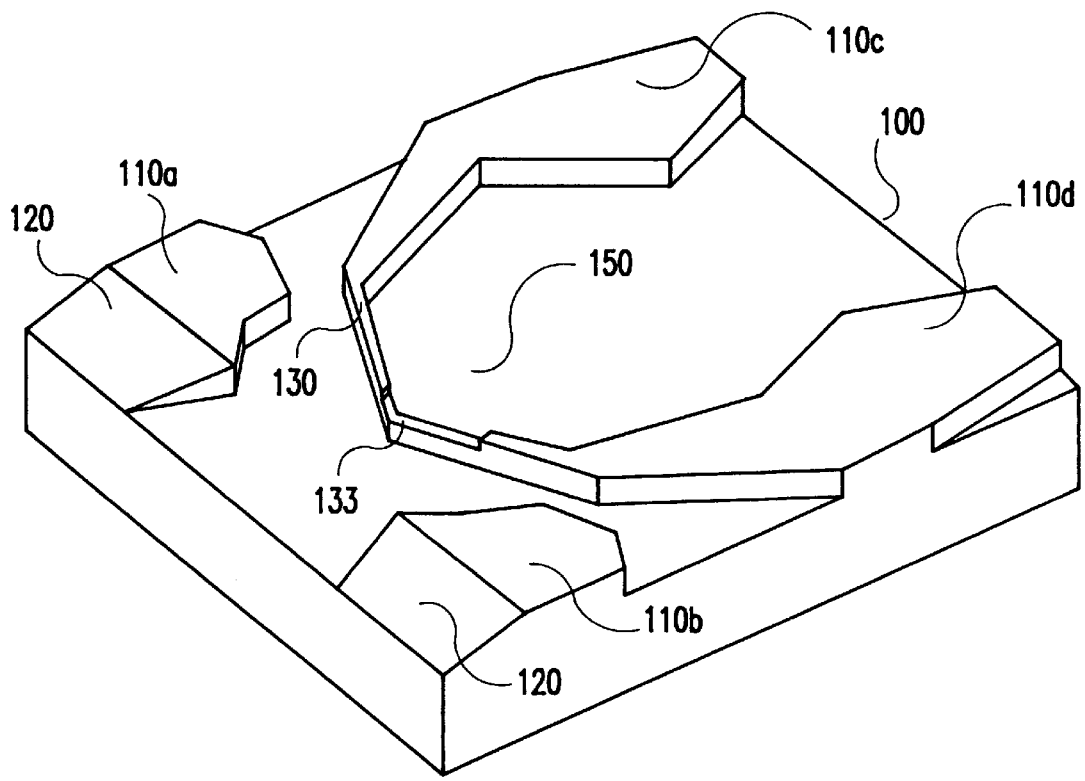
Figure 13:
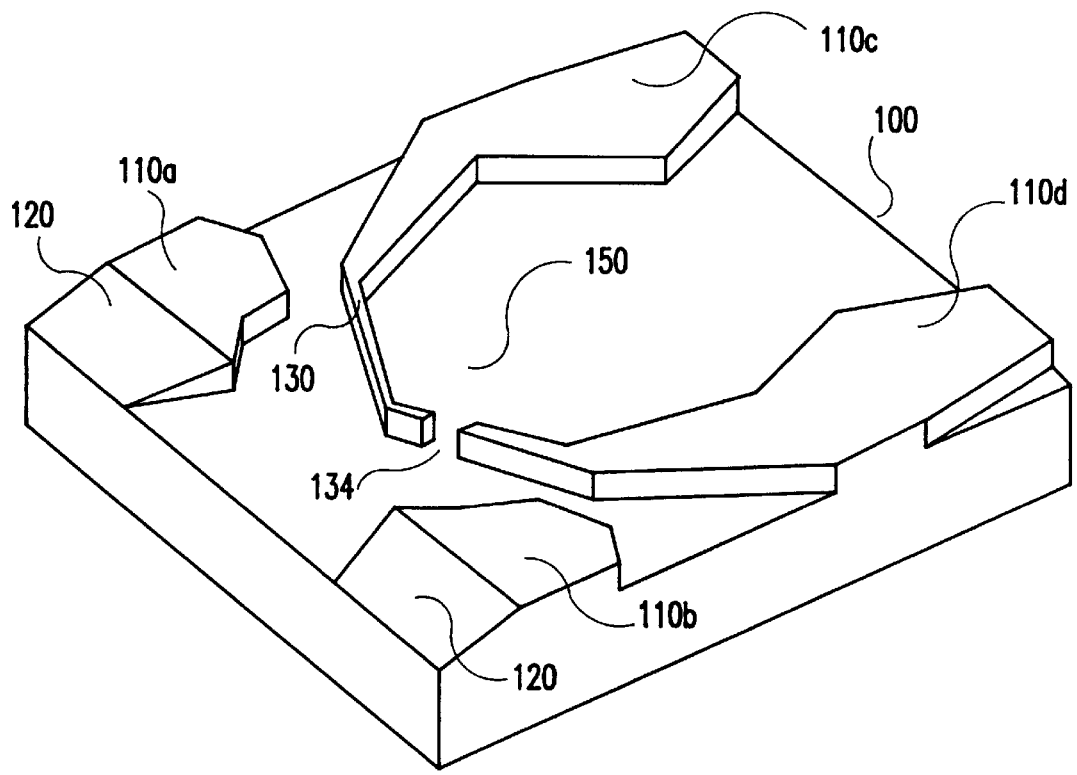

The recess 131 and the gap 132 of FIGS. 10 and 11 are symmetrically disposed on opposite sides of a central longitudinal axis of the slider body. FIGS. 12 and 13 illustrate alternative configurations in which the recess 133 and the gap 134 are offset from the longitudinal axis. In addition to the advantages of relieving negative pressure during take-off and reducing debris accumulation, these offset configurations provide a mechanism for biasing the aerodynamic characteristics to combat the problem of negative roll.

As described above, the NPAB type slider of the invention provides a relatively constant flying height, minimized roll and pitch angle variations, and excellent reliability. During operation, most of the positive pressure is generated at the four corner ABS's, and since the cross rail has a curved configuration, negative pressure is generated at a geometrical central area. This results in stable flying characteristics without substantial variations in the flying height and pitch and roll angles throughout the entire data range. Additionally, the curved cross rail minimizes contaminant accumulation.

While the present invention has been described in terms of the embodiments described above, those skilled in the art will recognize that the invention can be practiced with modification within the spirit and scope of the appended claims and their equivalents.

What is claimed is:

1. A negative pressure air bearing slider, comprising:
   a slider body for flying above a surface of a recording disc during relative rotation of the recording disc, the slider body having a principal surface for confronting the disc surface, said principal surface having a lead portion, a rear portion, a first side portion and a second side portion, wherein the lead portion is spaced upstream of the rear portion relative to a longitudinal direction of said slider body which is coincident with a tangential rotational direction of the recording disc, and wherein the first side portion is spaced from the second side portion relative to a lateral direction of said slider body;
   first and second projections extending from said lead portion of said principal surface of said slicer body to define first and second air bearing surfaces, respectively, wherein said first and second air bearing surfaces are spaced apart from each other in the lateral direction of said slider body;
   a third U-shaped projection extending from said principal surface and having a curved front wall portion at least partially located between said first and second projections and first and second side wall portions extending from opposite ends of said curved front wall portion to said rear portion of said principal surface so as to define a rounded negative pressure cavity therein, said curved front wall portion and said first and second curved side wall portions being spaced apart from said first and second projections, wherein the first and second curved side wall portions respectively extend along said first and second side portions of said principal surface and define third and fourth air bearing surfaces located at said rear portion of said principal surface and space apart from each other relative to the radial direction of said slider body.

2. A negative pressure air bearing slider as claimed in claim 1, wherein said U-shaped projection is symmetrically configured on opposite sides of a central longitudinal axis of said slider body.

3. A negative pressure air bearing slider as claimed in claim 2, wherein said first projection is symmetrically configured on one side of said central longitudinal axis of said slider body relative to said second projection.

4. A negative pressure air bearing slider as claimed in claim 3, wherein said first and second air bearing surfaces are respectively aligned with said third and fourth air bearing surfaces in the longitudinal direction of said slider body, and wherein said negative pressure cavity is centrally located between said first through fourth air bearing surfaces.

5. A negative pressure air bearing slider as claimed in claim 2, wherein said first and second air bearing surfaces are respectively aligned with said third and fourth air bearing surfaces in the longitudinal direction of said slider body, and wherein said negative pressure cavity is centrally located between said first through fourth air bearing surfaces.

6. A negative pressure air bearing slider as claimed in claim 1, wherein said first and second air bearing surfaces are respectively aligned with said third and fourth air bearing surfaces in the longitudinal direction of said slider body, and wherein said negative pressure cavity is centrally located between said first through fourth air bearing surfaces.

7. A negative pressure air bearing slider as claimed in claim 1, wherein said U-shaped projection is unsymmetrically configured on opposite sides of a central longitudinal axis of said slider body.

8. A negative pressure air bearing slider as claimed in claim 7, wherein said first projection is symmetry configured on one side of said central longitudinal axis of said slider body.

9. A negative pressure air bearing slider as claimed in claim 1, wherein said first and second projections include a tapered surface portion extending from said first and second air bearing surfaces, respectively, to a lead edge of said slider body.

10. A negative pressure air bearing slider as claimed in claim 1, wherein said curved front wall portion is continuous between said first and second side wall portions, and includes a stepped down portion having a height which is less than a height of a remainder of said curved front wall portion.

11. A negative pressure air bearing slider as claimed in claim 1, wherein an interface region between said curved front wall portion and said first side wall portion includes a first stepped down surface portion extending between said third air bearing surface and an inner edge of said slider body, and wherein an interface region between said curved front wall portion and said second side wall portion includes a second stepped down surface portion extending between said fourth air bearing surface and an outer edge of said slider body.

12. A negative pressure air bearing slider as claimed in claim 1, wherein an interface region between said curved front wall portion and said first side wall portion includes a first stepped down surface portion extending between said third air bearing surface and said negative pressure cavity, and wherein an interface region between said curved front wall portion and said second side wall portion includes a second stepped down surface portion extending between said fourth air bearing surface and said negative pressure cavity.

13. A negative pressure air bearing slider as claimed in claim 1, wherein said curve front wall portion is discontinuous between said first and second side wall portions and includes an opening extending to said principal surface of said slider body.

14. A negative pressure air bearing slider as claimed in claim 1, wherein said curve front wall portion is continuous and of a uniform height between said first and second side wall portions.

15. A negative pressure air bearing slider as claimed in claim 1, wherein said first and second projections include a stepped down surface portion extending from said first and second air bearing surfaces, respectively, to a lead edge of said slider body.

16. A negative pressure air bearing slider as claimed in claim 15, wherein the interface region between said curved front wall portion and said first side wall portion further includes a third stepped down surface portion extending between said third air bearing surface and said negative pressure cavity, and wherein the interface region between said curved front wall portion and said second side wall portion further includes a fourth stepped down surface portion extending between said fourth air bearing surface and said negative pressure cavity.

17. A negative pressure air bearing slider as claimed in claim 16, wherein said opening is centered across a central longitudinal axis of said slider body.

18. A negative pressure air bearing slider as claimed in claim 16, wherein said opening is offset from a central longitudinal axis of said slider body.

19. A negative pressure air bearing slider as claimed in claim 18, wherein said stepped down portion is offset relative to a central longitudinal axis of said slider.

20. A negative pressure air bearing slider as claimed in claim 18, wherein said stepped down portion is centered across a central longitudinal axis of said slider body.

* * * * *